United States Patent
Plessinger et al.

[15] 3,650,344
[45] Mar. 21, 1972

[54] RECREATIONAL VEHICLE

[72] Inventors: John A. Plessinger, 1725 Wesleyan Road, Dayton, Ohio 45406; Franklin Moore, Jr., 902 McBurney Drive, Lebanon, Ohio 45036

[22] Filed: Apr. 6, 1970

[21] Appl. No.: 25,816

[52] U.S. Cl.................................180/27, 180/35, 280/291, 280/282
[51] Int. Cl..........................................B62k 5/06
[58] Field of Search......................180/27, 26, 25, 30, 33, 35; 280/282, 291; D90/8; D14/4.12, 4.6; 296/28, 5

[56] References Cited

UNITED STATES PATENTS

| | | | |
|---|---|---|---|
| 2,797,123 | 6/1957 | Powell | 296/5 |
| D156,178 | 11/1949 | Stevens | D90/8 |
| 1,333,121 | 3/1920 | La Roche | 180/27 |
| 1,479,020 | 1/1924 | Ziemss | 280/87.02 X |
| 2,797,105 | 6/1957 | Douglas | 280/282 |
| 3,212,596 | 10/1965 | Johnson | 280/291 |
| 3,369,629 | 2/1968 | Weiss | 180/27 |

OTHER PUBLICATIONS

Design Magazine, Oct. 1968, page 57.

*Primary Examiner*—Kenneth H. Betts
*Attorney*—Joseph A. Brown, John C. Thompson, James J. Kennedy and George C. Bower

[57] ABSTRACT

The vehicle comprises a body with two rear driving wheels and a front steering wheel. The body comprises a forwardly narrow main frame with an intermediate bucket seat and an engine and axle supporting member extending rearwardly from around the seat for positioning the engine and drive wheels to the rear of the seat. A closed handle is attached to the front wheel for hand steering and stirrups are mounted on each side of the front wheel for foot steering by the driver with his legs on the opposite sides of the narrow front of the main frame.

12 Claims, 14 Drawing Figures

Patented March 21, 1972

INVENTOR
JOHN A. PLESSINGER
FRANKLIN MOORE JR.

Patented March 21, 1972

INVENTOR
JOHN A. PLESSINGER
FRANKLIN MOORE JR.

Patented March 21, 1972
3,650,344
5 Sheets-Sheet 3
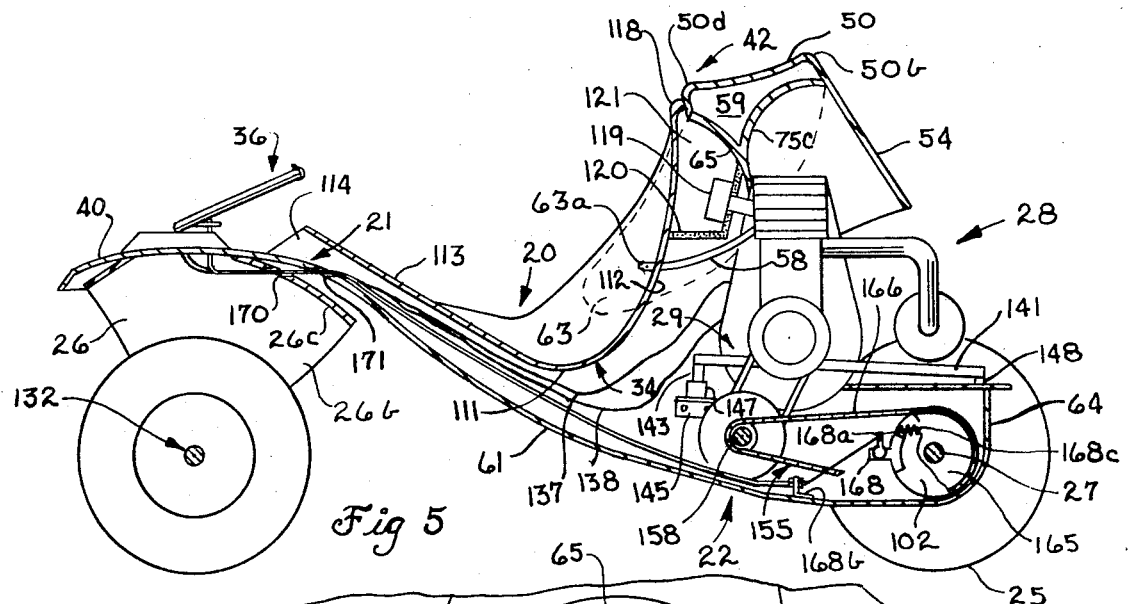
Fig 5
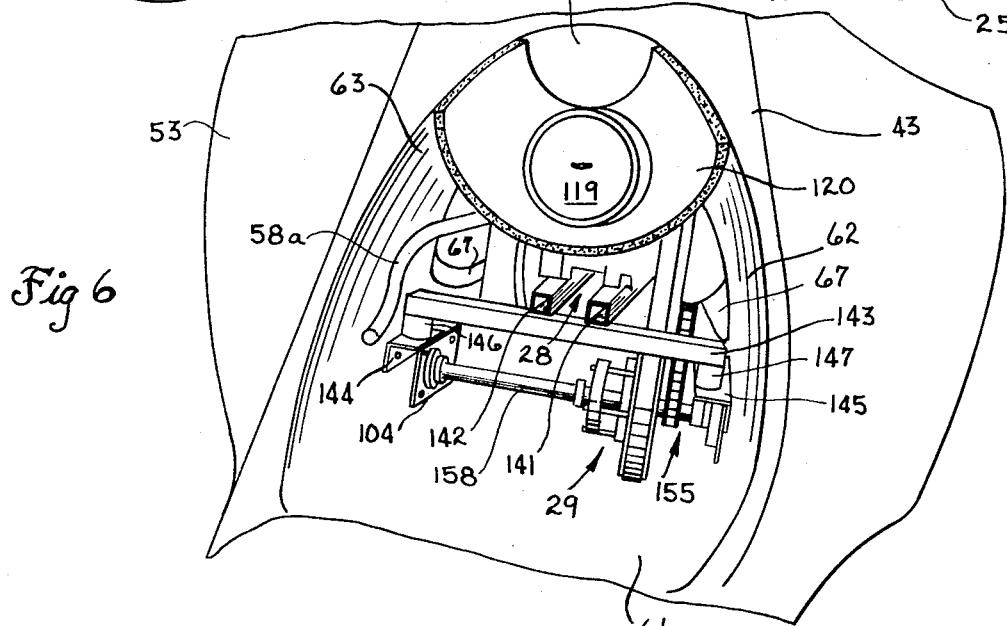
Fig 6
Fig 7
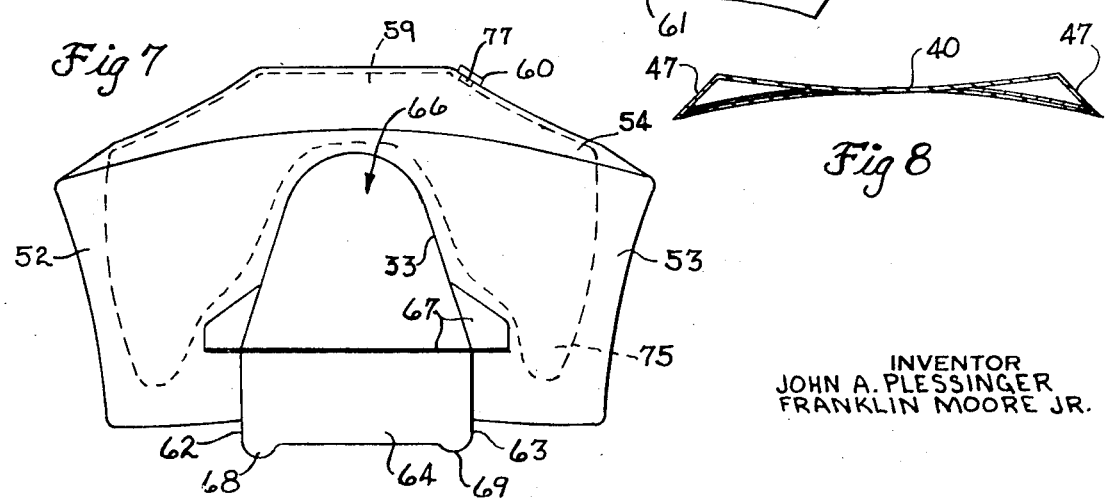
Fig 8
INVENTOR
JOHN A. PLESSINGER
FRANKLIN MOORE JR.

INVENTOR
JOHN A. PLESSINGER
FRANKLIN MOORE JR.

Patented March 21, 1972
3,650,344
5 Sheets-Sheet 5
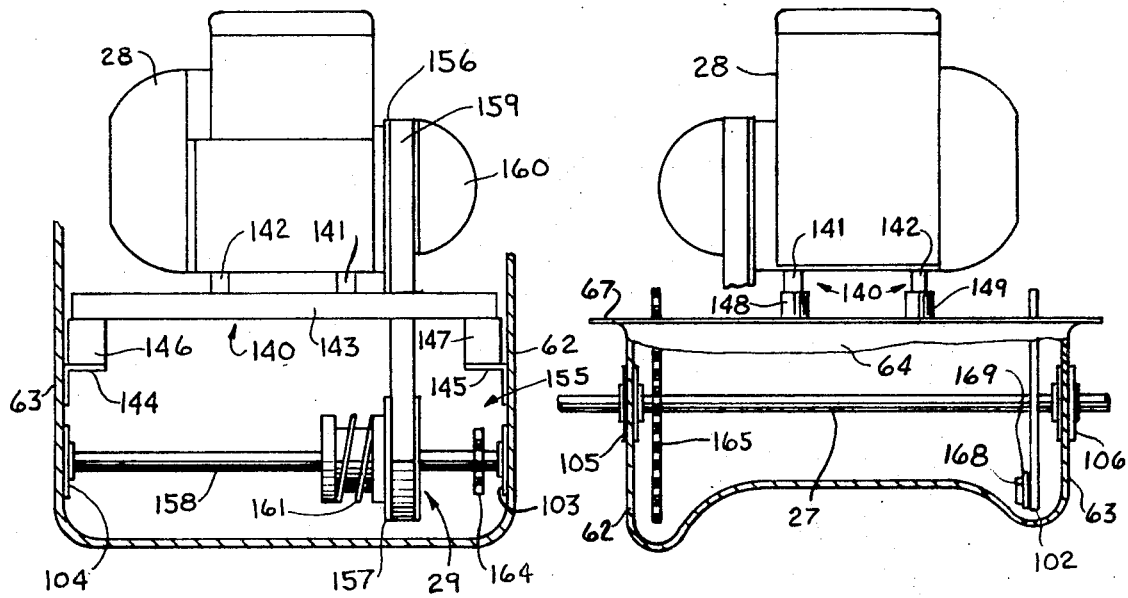
Fig 12
Fig 13
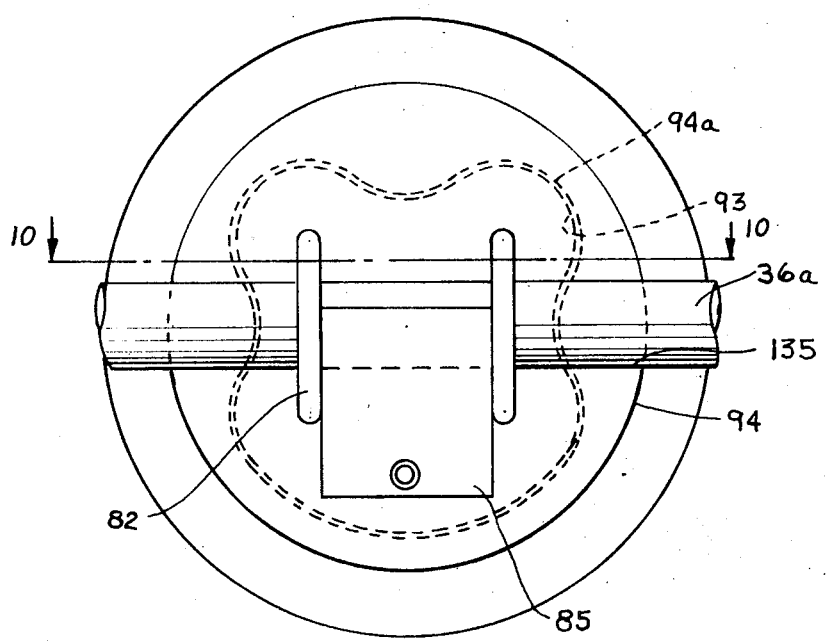
Fig 14
INVENTOR
JOHN A. PLESSINGER
FRANKLIN MOORE JR.

RECREATIONAL VEHICLE

FIELD OF INVENTION

This invention relates generally to recreational vehicles and more particularly to a three-wheeled self-propelled vehicle designed for off the highway operation.

BACKGROUND OF THE INVENTION

Recently a large popularity has developed in off-the-road operation of wheeled recreational and sports vehicles. Three general classes of these vehicles have evolved, namely two, four, and six wheeled.

The two wheeled vehicle is characterized by either the trailbike or mini-bike. Both of these are essentially small motorbicycles designed for driving through woods, along trails, and the like. These vehicles are popular due to their low cost and light weight, but are of limited utility since they require firm footing. Also, they require more than a minimum amount of skill to operate as they are somewhat unstable and may skid out from under the operator.

The four wheeled off-the-road vehicle is best characterized by the dune-buggy. These vehicles are somewhat similar to conventional automobiles having an air-cooled rear engine, but have been modified to accept high flotation tires to permit operation on said dunes, deserts, fields, and other depopulated areas. The six-wheeled off-the-road vehicle is characterized by the so-called all-terrain vehicles. These vehicles have three driven high flotation tires to either side of the vehicle, and the vehicle is steered by varying the speed of the wheels. The four and six-wheeled vehicles do not require as much skill to operate safely as a two-wheeled vehicle, and are capable of traversing a wider variety of terrains, however, they have a higher initial cost, are more expensive to operate, and do not give the operator as much sense of participation as does the two-wheeled vehicle.

OBJECTS AND SUMMARY OF THE INVENTION

An object of the invention is to provide a recreational vehicle which is fun to operate. More particularly it is an object of the invention to provide a vehicle which requires little initial skill to operate but which will challenge the operator to become more skillful in its operation. Another object is to provide a vehicle having a low center of gravity in which the operator sits relatively close to the ground. A further object is to provide a recreational vehicle having a high sense of operation participation.

Another object of the invention is to provide a recreational vehicle of an intermediate price which is operable over a wide variety of terrains.

Another object of the invention is to provide an off-the-road, terrain type recreational vehicle that is inexpensive to operate and maintain.

Another object of the invention is to provide an off-the-road, terrain type of recreational vehicle that is relatively easy to transport.

Another object of the invention is to provide a recreational vehicle in which the operator is seated to be part of the vehicle.

In summary, the vehicle comprises a hand and foot steerable wheel in front, a rear engine driving two rear wheels, and a body with a narrow forward portion and a bucket seat having a bowl shaped portion, downwardly sloped front and back parts to recess the operator within the body for moving the vehicle and steering the front wheel by the feet of the operator engaging the front wheel on opposite sides of the forward portion.

BRIEF DESCRIPTION OF THE DRAWINGS

FIG. 5 is a lengthwise sectional view of the body of the vehicle taken along line 5—5 of FIG. 2.
FIG. 6 is a perspective view of a portion of the vehicle taken from the left front, the seat being removed.
FIG. 7 is a rear view of the body of the vehicle looking slightly upwardly.
FIG. 8 is a cross-sectional view of the forward portion of the body taken along the lines 8—8 in FIG. 9.
FIG. 12 is a section taken along the lines 12—12 of FIG. 4 showing the engine support member.
FIG. 13 is a rear view of the engine, engine mounting and support member with the end wall of the support member broken away.
FIG. 14 is a top view of the steering mechanism.

DESCRIPTION OF A PREFERRED EMBODIMENT

Introduction

Figure 1:
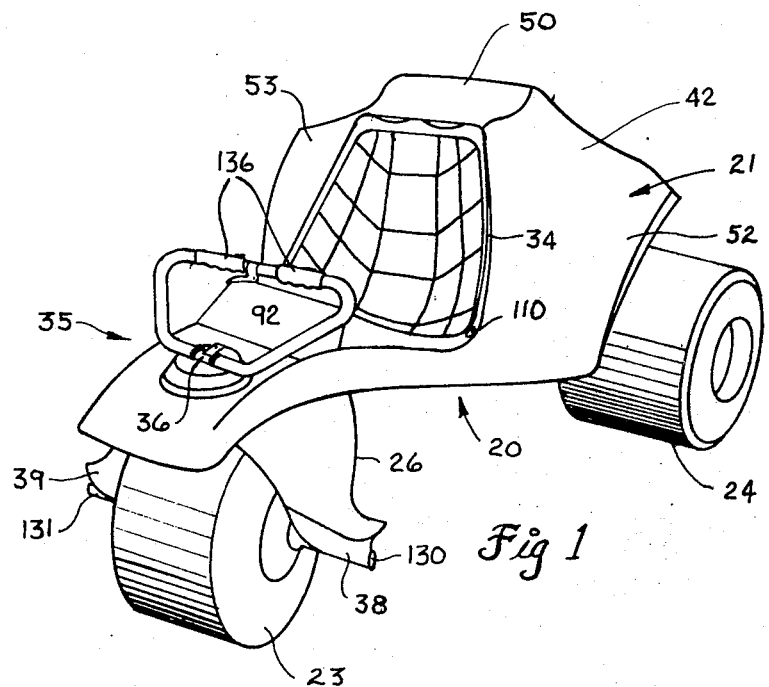
FIG. 1 is a perspective view of the vehicle.

The vehicle is best illustrated in FIGS. 1-4 and includes a body, indicated generally at 20, supported by a single front steerable wheel 23 and two rear drive wheels 24, 25. Each of the wheels includes a rimmed hub and a high flotation tire of the type which is characteristically inflated from 2 to 6 pounds per square inch. The body has a main frame, indicated generally at 21 and an engine support frame, indicated generally at 22, the engine support frame extending rearwardly from an intermediate portion 41 of the main frame and being below the rear or back portion 42 of the main frame. The rear drive wheels 24 and 25 are mounted on a live transversely extending axle 27 which is rotatably journaled in the engine support frame 22. An engine 28 is mounted on the frame 22 and is drivingly connected to the axle 27 by drive means indicated generally at 29 in FIG. 10.

An opening 33 is provided in the middle or intermediate portion 41 of the main frame 21 at the interface of the engine support frame and the main frame. A seat indicated generally at 34 is mounted within the opening.

The front wheel 23 is rotatably mounted in a fork 26 journaled within the front of the main frame. The fork includes left and right hand stirrups 38 and 39, respectively. Rearwardly extending steering means 35, including a handle 36, is secured to the upper portion of the fork 26.

The driver sits in a partially reclined position in the seat 34 with his feet resting on the stirrups 38, 39 and his hands grasping the handle 36. The vehicle may be steered either by the handle 36 or by through the stirrups 38, 39.

The speed of the vehicle is controlled by a throttle 44 mounted on the handle 36. The braking of the vehicle is controlled by raising the steering means 35 in a manner more fully set forth below.

Body

Figure 2:
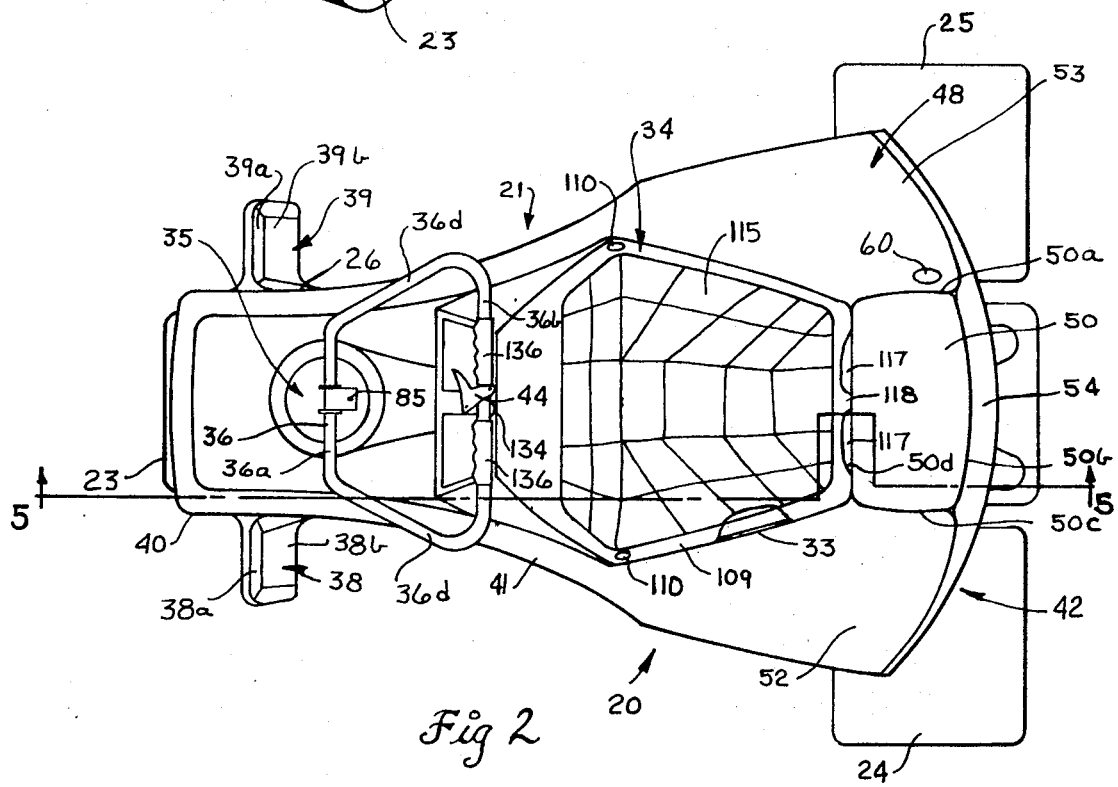
FIG. 2 is a top view of the vehicle.
Figure 3:
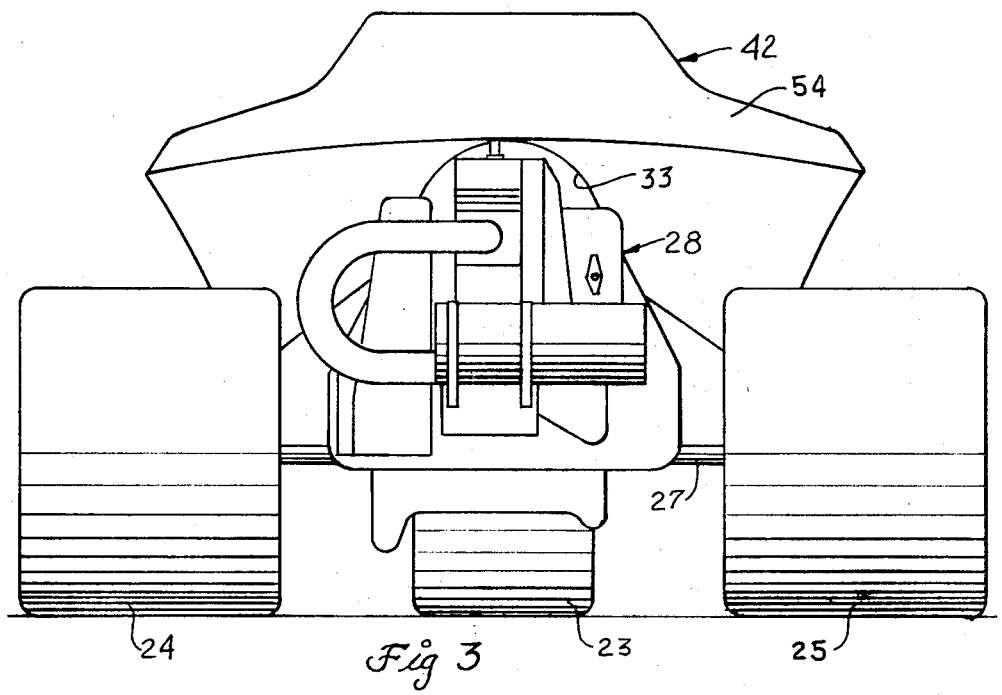
FIG. 3 is a rear view of the vehicle.
Figure 4:
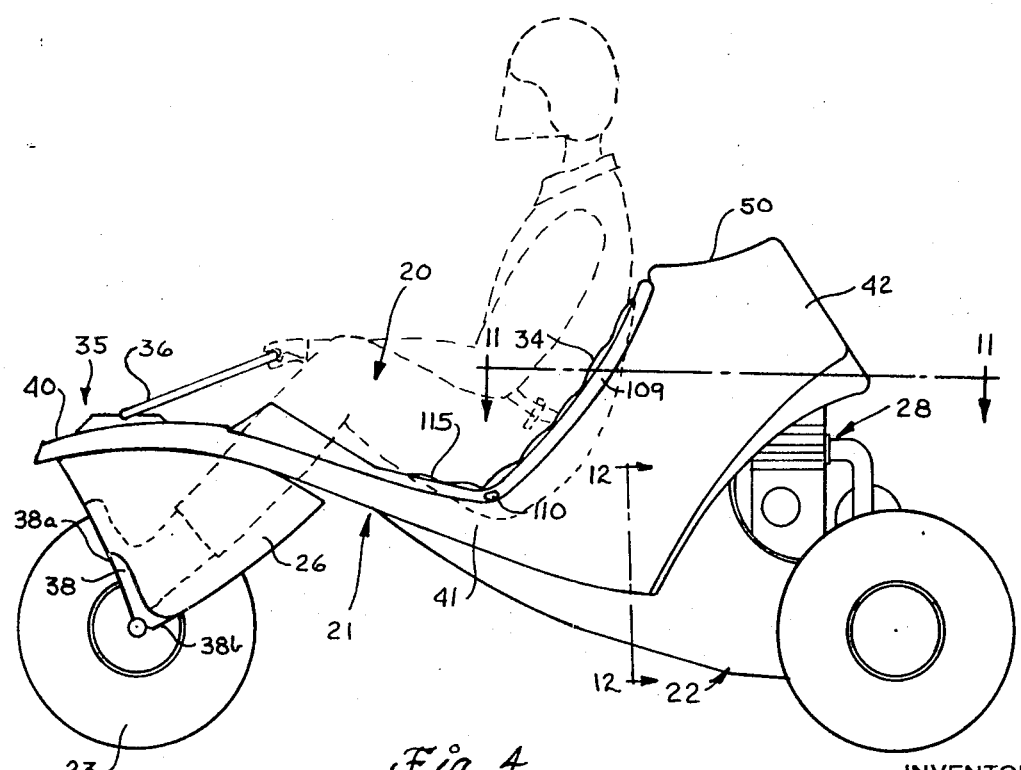
FIG. 4 is a side view of the vehicle.
Figure 9:
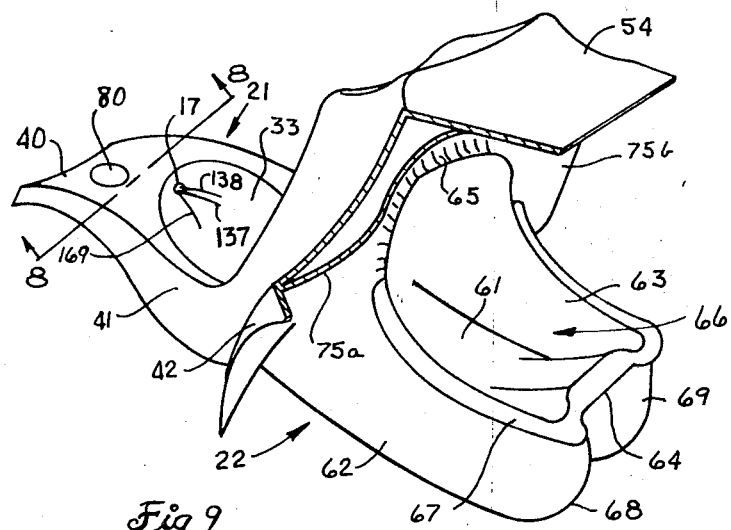
FIG. 9 is a perspective view of the body of a vehicle, a portion being cut-away.

The body 20 is preferably made of fiberglass and formed in a single piece. Although manufactured as a single piece the body has two distinct parts, the main frame 21, and the engine support frame 22. The main frame 21 is best seen in FIGS. 1 and 2 and the engine support frame 22 is best seen in FIGS. 4, 5, and 7. The main frame has a forward portion 40, an intermediate portion 41 and a rear or back portion 42. The fork 26 is journaled within the forward portion in a manner described later herein. The intermediate portion has a seat receiving opening 33 extending rearwardly from the back edge of fork 26 and upwardly adjacent to the back portion 42. The width of the opening is slightly less than the width of the main frame and a peripheral edge or rim 43 (FIG. 9) is disposed around the opening. The frame narrows along the forward portion 40 so that the forward portion has a width less than the widest part of the intermediate portion 41. This permits the legs of the driver to straddle the frame and rest in the stirrups. The forward portion 40 has triangular shaped tubular beam portions 47 to stiffen the forward portion.

The back portion 42 extends rearwardly from the upwardly extending portion of rim 43. An auxiliary seat 50 is provided at the top of the back portion extending rearwardly from the rim to provide a seat for a second rider on the vehicle. The buddy seat is concave in shape and defined by the edges 50a,b,c,d. Extending downwardly, outwardly, and rearwardly from the rear portion of rim 43 and the auxiliary seat are flared side portions 52, 53, and a transverse downwardly extending portion 54.

The engine support frame 22 is of a very general tubular configuration and joins the main frame at and to form part of the rim 43. The engine support frame 22 extends rearwardly from this opening 33. The engine support frame has a bottom wall 61, side walls 62, 63 and a rear wall 64 (FIGS. 5 and 7), and upper wall 65 of short longitudinal length. A flange 67 generally normal to the wall 62, 63, 64 extends therearound as shown in FIG. 7. The bottom wall 61 and the rear wall 64 have 68 and 69 for providing space for a sprocket 165 and a disc brake 102, respectively, later described herein.

Right and left gas tanks 58 and 57, respectively, and interconnecting passageway 59 are formed within the body of the vehicle. The walls of the gas tanks are formed by the flared side portions 52, 53, and side walls 62 and 63 and also by portions 75a and 75b of a rear wall 75. The rear wall 75 has an intermediate portion 75c which cooperates with the buddy seat 50 and the short upper portion 65 to enclose the passageway 59. An inlet 77 to the gas tanks is provided on the right side portion, the inlet 77 normally being covered by a cap 60. The right tank is also apertured as at 63a and a gas line 58a runs from the tank 58 to the carburetor (not shown) on the engine 28. In operation when the right hand compartment 58 is depleted of fuel and the engine stops the compartment can be refilled by tilting the vehicle and pouring the fuel from the left compartment 57 through the passage 59 into the right compartment 58. The driver will then know that he is operating on reserve fuel and has only a limited period of time to operate the vehicle.

The removable seat 34 is disposed in the opening 33 and has a flange 109 of varying width extending along the side and across the top, the flange overlying the rim 43. Bolts 110 extend through the flange 109 and thread into the intermediate portion 41 to fasten the seat to the body. The seat has a bowl shaped portion 111 at the center for receiving the driver. The bowl shaped portion extends into the opening 33 in spaced relation to and above the bottom wall 61 of the engine support member 22. A back part 112 extends substantially vertically along the edge of the opening 33 as best illustrated in FIGS. 4 and 5. A front part 113 extends forwardly and is spaced from the main frame 21 to form an opening 114 between the forward portion 40 and the seat 34 for admittance of air underneath the seat. An air filter or screen may be placed at the opening 114 to clean the entering air, which moves rearwardly under the seat to cool the engine.

The driver sits in the bowl shaped part 111 tilted slightly and with the legs at an upward angle (FIG. 4). The front part is at an upward angle and the back part extends upwardly to hold the driver or occupant in firm relation with the vehicle on acceleration and deceleration. The sides of the bowl shaped part hold the operator on turning. The seat positions the feet in stirrups 38, 39, respectively. This places the operator in a slight jackknife position. A cushion liner 115 fits into the seat. The operator grasps the handle 36 for steering the front wheel 23.

Wheels and Steering Means

The tires on the wheels 23, 24, 25 are of the low pressure type with a small diameter and a wide width. The rear wheels 24, 25, are fixed on the axle 27 and rotate therewith. The axle 27 is mounted in bearing 105 in wall 62 and bearing 106 in wall 63 to rotatably support the axle in the body. The axle is rearward of the motor or engine 28 so that the engine is between the axle or seat 34.

The front wheel 23 is mounted on forward portion 40 of the main frame 21 with the axle 132 rearward of the axis of pivot. The steering means 35 comprises the fork 26 with a fork steering block 93 and a cap 94. The cap and block are fastened together by the U-bolts 82 and nuts 83. The bolts 82 rotatably fasten the handle 36 on the cap 94.

The fork 26 is of a generally U-shape with side members 26a, 26b on opposite sides of the wheel and a bridging member 26c extending between side members. At the lower end of the side members 26a, b are stirrups or foot receiving means 38, 39 and cylindrical portions 130, 131 underneath the stirrups. The cylindrical members are axially aligned to receive the axle 132 (FIG. 5) on which the front wheel 23 is rotatably mounted. The bridging member 26c has an annular shoulder 133 (FIG. 13) between the forward portion 40 and the yoke portion 26c. An annular washer 89 is between the cap 94 and the forward portion 40. For smooth relative rotation of the fork and cap in relation to the forward portion 40. The block 93 extends through the circular opening 80 in the forward portion 40 to fit the block within the irregular recess 94a in the cap 94 (FIG. 12). The block 93 and recess 94a have a plurality of convex and concave surfaces to interlock the two members. The bolts 82 and nuts 83 securely fasten the cap and fork together. The cap has a groove 135 for receiving straight portion 36a of the handle 36. The cap rotatably supports the handle and the handle moves forwardly and rearwardly from a operating position to a forward braking position.

The handle 36 is a closed loop with a straight portion 36a extending through the U-bolts 82 and groove 135 in the cap 94 and with a parallel straight portion 36b with grips 136 for grasping by the operator. The two straight portions are connected by straight portions 35d. A throttle actuator 44 of conventional design is pivotally mounted on a straight portion 36d between the grips 136 for actuation by the right hand. The throttle is connected to the engine by a cable 138. Thus, the handle bar presents the straight portion transverse to the operator with no free ends.

The stirrups 38, 39 are cut or dished with a forwardly and upwardly extending surfaces 38a, 39a to receive the respective insteps of the operator and upward and rearward portions 38b, 39b, to receive the back of the heel of the operator. Thus, the feet of the operator are firmly held in the stirrups and the stirrups can receive the pressure from the feet to turn the wheels. The sides 26a,b protect the leg of the operator from the front wheel 23. The top portion 26c of the fork is curved downwardly to provide clearance from the forward portion 40 of the main frame. Thus, the front wheel and fork freely rotate without engaging the main frame or the wheel accidentally rubbing against the legs of the operator. The sides also shield the legs of the operator from mud, dirt and water that is picked up by the front wheel.

Engine Mounting and Drive

Figure 10:
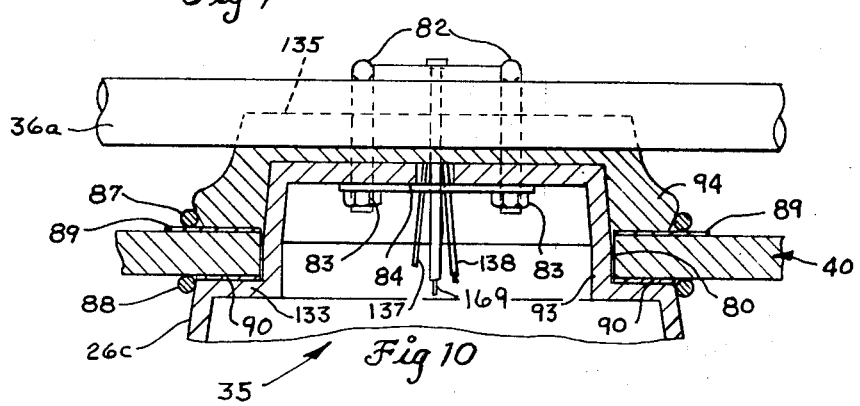
FIG. 10 is a sectional view of the steering mechanism taken along the lines 10—10 of FIG. 14.
Figure 11:
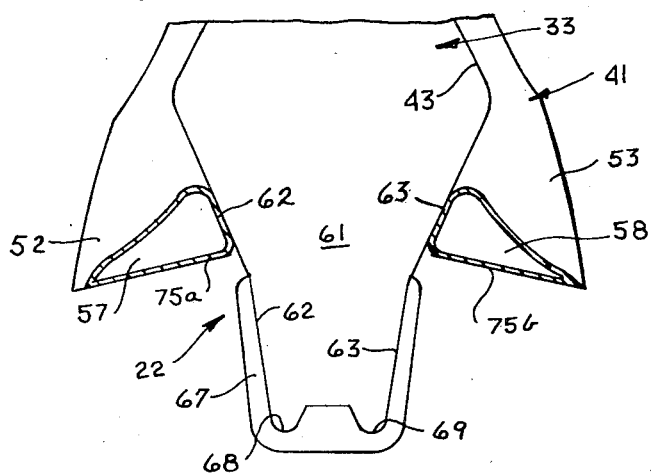
FIG. 11 is a sectional view of the body taken along the lines 11—11 of FIG. 4 with the seat and engine omitted to show the saddle type fuel tanks.

The engine 28 is at a conventional single cylinder air cooled type and is supported on the engine support frame 22 by the mounting 140, best illustrated in FIGS. 5, 10, and 11. The engine is attached to two parallel spaced square box beams 141, 142 extending longitudinally to the body. Forwardly of the engine the beams are mounted on a transverse beam 143. The beam 143 is supported at its ends by brackets 144, 145 mounted on the side wall 63, 62, respectively, and the resilient mountings 146, 147 positioned, respectively, between the brackets and the end of the beams 143. At the rear the beams 141, 142 are mounted on the flange 67 by the resilient mounting 148, 149, respectively.

As seen from the foregoing explanation and the drawings the engine 28 is positioned immediately rearwardly of the seat 34 and has the upper part partially enclosed by the back portion 42 of the main frame 21.

The rear axle 27 and the rear wheels 24 and 25 are driven by the engine through the conventional variable speed drive means 29, intermediate jack shaft 158, and the chain drive 155. The variable speed belt and pulley drive 29 comprises a variable sheave 156 on the engine and a spring loaded variable sheave 157 on intermediate jack shaft 158. The variable sheaves are coupled by a V-belt 159. The speed of the engine 28 is controlled by the throttle 44. The speed and torque applied to the rear wheels is controlled by the automatic torque and speed control 160 mounted on the driving sheave 156. The control 160 varys the pitch of the driving pulley 156 in cooperation with the spring 161 bearing against the variable sheave 157. The chain drive 155 comprises a sprocket 164 on the shaft 158 and a sprocket 165 on the axle 27 and the chain 166. The sprocket 166 drives the axle 27 and the rear wheels 24, 25.

The engine is provided with a customary carburetor (not shown) and air cleaner 119. The air cleaner is mounted forwardly of the engine and projects through a foam rubber partition into a compartment 121. The compartment 121 is defined by the foam rubber partition, the upper wall 65 upon which the foam rubber partition 120 is mounted, side walls 62 and 63 and the back of the seat 34. Air enters into the chamber 121 through passageways 117 disposed to either side of a boss 118 on the top back of the seat, the boss abutting against the rim 43. By providing the compartment 121 with the upper air intake relatively clean air is provided for the carburetor.

A disc 102 is mounted on the live axle 27. A conventional disc brake 168 is mounted on the side wall 63 and is actuated through a cam lever 168a to bias the shoes of the brake towards each other to engage the disc 102 therebetween. The brake is actuated by lifting the handle bar 36. A plate 85 is rigidly mounted on the transverse forward portion 36a of the handle bar, and one end of a sheaved brake cable 169 is fastened to the plate 85. To engage the disc 102 with the disc brake 168 it is only necessary to swing the handle bar 36 upwardly and forwardly thus actuating or shifting the brake cable (through plate 85) in a forward direction to force the cam lever 168a in a forward direction to cam the shoes of the brake 168 towards each other. The sheath of the cable 169 is bolted to a bracket 168b mounted on the floor 61. A spring 168c returns the cam lever of the brake 168 to its normal position when the handle bars 36 are lowered. As can best be seen from FIG. 5, the brake cable passes through an opening 171 in the main body must beneath and behind the forward end of the seat 34. The cable then runs under the seat to the bracket 168b. Also passing through the opening 171 is the electrical wire 137 for the kill button 134, and the throttle control cable 138. A hand throttle 44 is mounted on the straight portion 36b of the handle 36 and is connected to the cable 138 in a conventional manner. The cables 137, 138 pass through the inside tubular handle 36 and then through a bore in the cap 94.

Summary of Advantages and Features of Inventions

It is thus seen from the foregoing description that off-the-road vehicles have been developed with which the drive is integral and cooperatively coordinated with the vehicle to experience the full sensation of driving. The driver is seated in a bucket type seat with upwardly extending portions from the front and rear to hold the occupant in close relation with the vehicle on acceleration and deceleration. The intermediate portion of the main frame curves downwardly to position the seat between the upper portion of the front wheel and the engine. Thus, the operator is set low in the vehicle and supported in back and in front. The main frame is narrow in the front so that the legs of the occupant can easily be held outside the frame and rest in the stirrups on the front wheel for steering the vehicle or engage the ground to assist in the maneuvering of the vehicle. Thus, in addition to fitting snugly in the frame of the vehicle the occupant can also steer the vehicle adding to the cooperation between the occupant and the vehicle. The recessed seating of the occupant also adds to the sidewise sensation of the turning of the vehicle. Thus, the occupant moves with and is part of the vehicle on acceleration and deceleration in turning.

Other features and advantages of the vehicle is the simplicity of the body and the drive and steering means resulting in the vehicle being less expensive than the more sophisticated all-terrain vehicles. Yet, the vehicle can traverse many types of dry terrain as easily and with as great a maneuverability as an all-terrain vehicle. In addition to the advantages and features set forth above the vehicle is lighter in weight, smaller in size than the all-terrain vehicle so that it can be more easily transported to the area of operation.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A motor driven, wheeled vehicle of a low center of gravity, comprising:
    a body having an intermediate portion with a width for a single occupant seat; and
    a forward portion narrowing towards the front to provide space to each side of the body for the legs of an occupant;
    an engine support frame extending rearwardly from said intermediate portion;
    said frame having means for movably supporting said body and an engine mounted on said engine support frame and drivingly connected to said last mentioned means;
    a bucket type seat mounted in said intermediate portion at substantially the same level as said engine;
    front wheel means; and
    means for journaling said wheel means on said forward portion with the center of ground engagement in the center line of said body;
    said front wheel means having foot receiving means on each side thereof for a respective foot of an occupant;
    said bucket type seat having a shape extending in overlapping relation with said frame and recessing an occupant in a firm cooperative relation with the vehicle to steer the vehicle through said foot receiving means and to engage the ground with either foot when desired.

2. A motor driven, wheeled vehicle as set forth in claim 1, wherein said bucket type seat has a front part extending upwardly and a back part extending substantially vertically to hold an occupant on change of speed longitudinally of the vehicle.

3. A motor driven, wheeled vehicle as set forth in claim 2, wherein said seat has a bowl shape intermediate part for holding an occupant on turning of the vehicle.

4. A motor driven, wheeled vehicle as set forth in claim 1, wherein said back part of said body and said engine support frame extend rearwardly from said opening and spaced overlapping relation and a rear wall is provided extending between said back portion and said engine support frame to form a generally U-shaped liquid fuel tank having two compartments on opposite sides of said engine support frame and an upper interconnecting passage for transference of liquid fuel from one compartment to the other.

5. A motor driven, wheeled vehicle as set forth in claim 1, wherein said engine support frame extends to said forward portion and said seat is spaced therefrom to form a passage extending from the forward portion rearwardly for conducting air from the front of the vehicle under said seat to said engine.

6. A motor driven, wheeled vehicle as set forth in claim 1, wherein said engine support frame has a bottom wall extending rearwardly from said forward portion past said axle, two oppositely faced side walls extending rearwardly from said intermediate portion and having means for rotatably supporting said axle.

7. A motor driven, wheeled vehicle as set forth in claim 6, wherein said engine support frame has a bottom and side walls forming an engine opening downwardly and rearwardly from said back and intermediate portions and means mounted on said side and rear walls for supporting said engine in said engine opening and rearwardly of said body.

8. A motor driven, wheeled vehicle as set forth in claim 1, wherein said means for pivotally mounting said wheeled means is a U-shaped forked member having an axle rotatably supporting said wheeled means and a block extending through said forward portion and a cap fitting thereover and bolted thereto for pivotally fastening said forked member to said forward portion.

9. A motor driven, wheeled vehicle as set forth in claim 8, wherein said cap has a closed handle pivotally fastened to said cap to move in the plane of said wheeled means to actuate said brakes.

10. A motor driven, wheeled vehicle as set forth in claim 1, wherein said intermediate portion curves gradually downwardly and rearwardly of said wheeled means and then extends steeply upwardly and rearwardly.

11. A motor driven, wheeled vehicle as set forth in claim 1, wherein said bucket type seat and said intermediate portion at the upper end of said seat have opening means and said engine has an intake adjacent said seat for receiving air through said opening means.

12. A motor driven vehicle having a low center of gravity comprising: a longitudinally extending body having an intermediate portion with a width of a single occupant seat and an upwardly and forwardly extending portion narrowing towards the front to provide space to each side for the legs of an occupant, an engine support frame extending rearwardly from said intermediate portion, means disposed to either side of said frame for movably supporting said frame, an engine disposed between said last mentioned means and drivingly interconnected with the same, front wheel means, and means for journaling said wheel means on said forward portion with the center of ground engagement on said center line of said body, said front wheel means having foot receiving means on each side thereof and below the forward portion for a respective foot of an occupant, and steering handle means disposed above said forward portion.

* * * * *